Dec. 23, 1969    J. NEUMANN    3,485,090
DEVICE FOR A REMOTE CONTROL ADJUSTMENT OF
MEASURING TABLES OR WORK TABLES
Filed Nov. 17, 1966    2 Sheets-Sheet 2

United States Patent Office 3,485,090
Patented Dec. 23, 1969

3,485,090
DEVICE FOR A REMOTE CONTROL ADJUSTMENT OF MEASURING TABLES OR WORK TABLES
Joachim Neumann, Oberkochen, Germany, assignor to Carl Zeiss-Stiftung, doing business as Carl Zeiss Heidenheim, Wurttemberg, Germany, a corporation of Germany
Filed Nov. 17, 1966, Ser. No. 595,065
Claims priority, application Germany, Nov. 25, 1965, Z 11,886
Int. Cl. G01n 3/48
U.S. Cl. 73—81
5 Claims

ABSTRACT OF THE DISCLOSURE

Device for remotely controlling the adjustment of a vertically adjustable work carrying table provided with a compensation circuit having arranged therein a remotely controllable potentiometer and an inductive scanner for measuring the table displacement.

---

Figure 1:
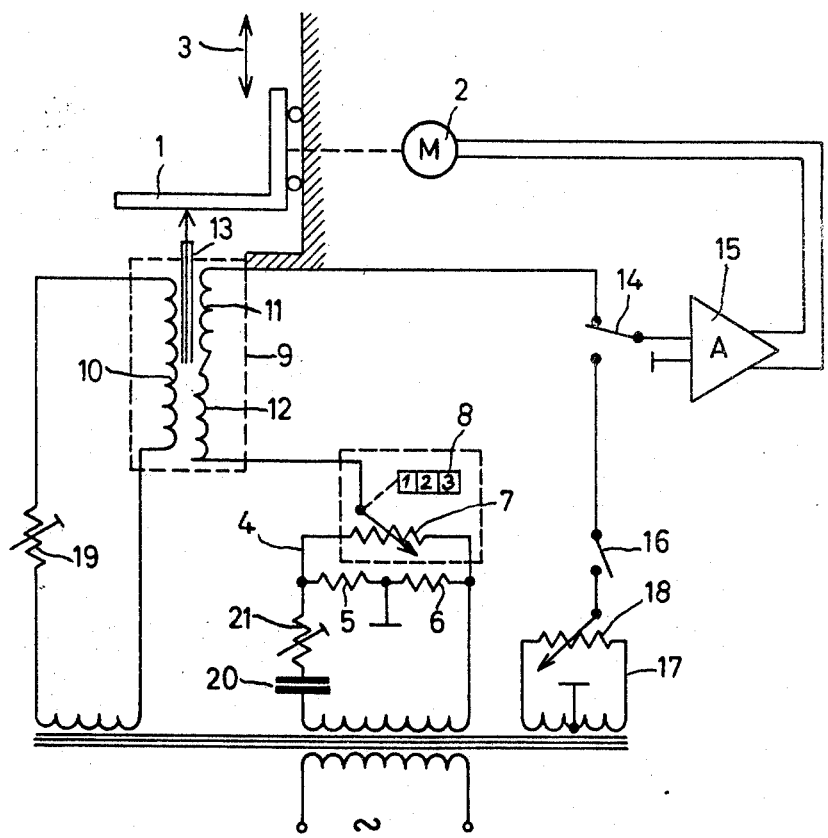

The invention relates to a device for remotely controlling the adjustment of measuring tables or work tables, i.e. tables which carry an object to be measured, to be observed or to be worked upon, or which carry the means for measuring, observing or working upon an object. Such a remote control adjustment may, for instance, be required to automate a measuring method or a production process.

A remote control adjustment may be made in such a manner that upon a movement of the control member a constant or variable speed of the adjustment position (speed control) takes place, or that a movement of the control member corresponds to a certain distance at the position of adjustment (distance control). Devices for distance control are as a rule more complex and costly than devices for speed control, but because of their great sighting accuracy they have substantial advantages over speed control devices in connection with objects which are generally in a fixed position and are to be adjusted to exact target points only occasionally.

Devices of this kind are assigned the task of surrounding a certain environmental field starting from a preselected zero position of the measuring or work table within the adjustment range of the remote control adjustment, whereby the zero position may intermittently be used as many times as desired. This kind of work is expected for instance from measuring microscopes or from devices for working upon a workpiece deposited on the work table on given places which are oriented with reference to a zero position.

The object of the present invention is a device for remotely controlling the adjustment of measuring or work tables which in addition to a controlled movement of the measuring or work table makes the storing of an optionally preselectable zero position possible.

The device according to the invention includes a compensation circuit provided with an inductive scanner for measuring the table displacement and serving for the preselection and the storing of a table zero position; the device also includes means for generating a variable voltage for the displacement of the table from its zero position, and a switch for selectively connecting a servomotor effecting the table displacement with this means or with the compensating circuit just mentioned.

The compensation circuit has the form of a bridge circuit the voltage of which in the zero branch is variable by the remote control potentiometer. To said zero branch is connected the output of the inductive scanner and the servomotor for the table displacement arranged in series with the inductive scanner by means of the switch. It is more expedient, however, to connect the servomotor not directly but by way of an amplifier into the zero branch of the bridge circuit.

It is further useful to equip the remote control potentiometer with a device for the digital indication of the potentiometer position.

The inductive scanner serving for measuring the table displacement is preferably constructed in the form of a differential transformer with a displaceable core. A scanner of this kind has a high measuring accuracy and the measuring range scanned by it is a very large one.

First of all, the remote control potentiometer is adjusted for preselecting the table zero position. The result is that a voltage difference is produced in the zero branch of the compensation circuit and the servomotor connected in the zero branch effects a table adjustment. This table adjustment is concurrently measured by the inductive scanner and the voltage generated by the inductive scanner compensates for the voltage difference in the zero branch of the bridge. As soon as no longer any voltage is present in the zero branch of the bridge, the servomotor ceases to operate and the table displacement is discontinued. Thereafter the switch is shifted over so that the servomotor is connected to a means for generating a variable voltage. Now the servomotor displaces the table in terms of a speed control. Upon a predetermined table adjustment the switch is returned to its former position and the servomotor is thereby again connected in the zero branch of the bridge. Since the adjustment of the remote control potentiometer has been maintained during the last described table displacement, the table is now again returned to the zero position by the servomotor and this is done with a high degree of accuracy. Due to this selected compensation measuring method in accordance with the invention the precision with which the table again is moved to the zero position is very great. It may amount to $10^{-4}$ of the adjustment range.

The device according to the invention is particularly useful for the adjustment of the table carrying a workpiece in a hardness tester in which the impression upon the workpiece in the zero position of the table is observed by means of a microscope. In such a hardness tester, first, the table is optimally focussed by means of the remote control potentiometer. Then the microscope tube or part thereof is replaced by a structural element which produces the hardness impression upon the workpiece. By shifting the switch the table moves upward and thereby the hardness impression is produced. After the hardness impression is completed, the observation tube is reinserted, the servomotor for the table adjustment is reconnected in the zero branch of the compensation circuit by means of the switch and the table returns to its zero position. In this position the table is optimally focussed so that without further manipulations the hardness impression on the workpiece can be observed and measured.

Figure 2:
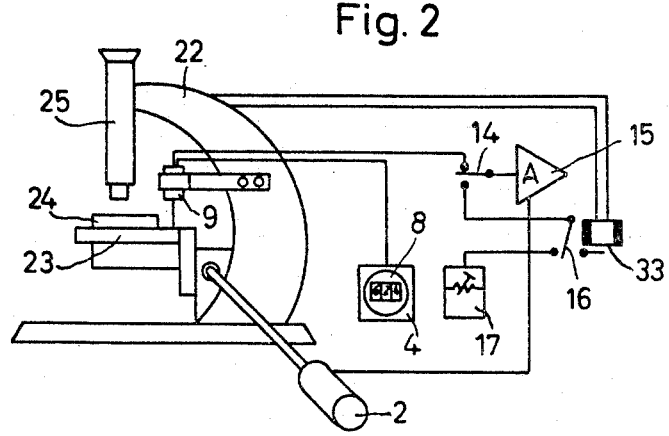
Figure 3:
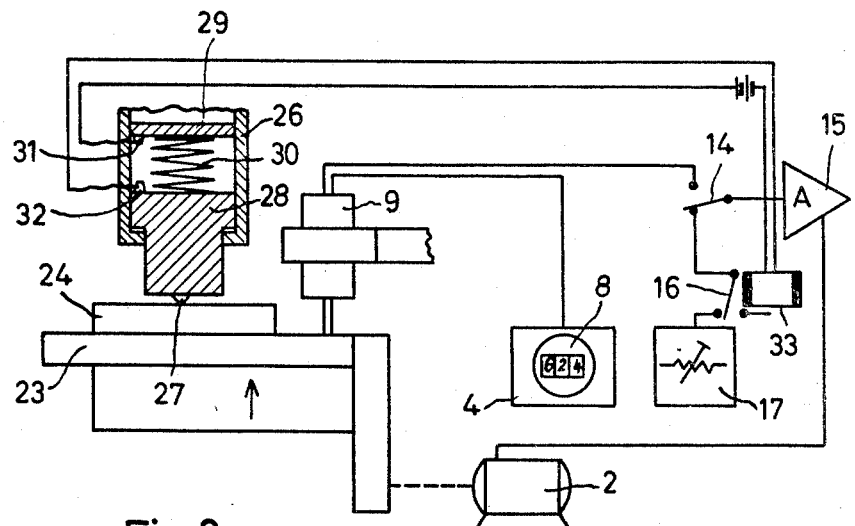

The invention will be described in further detail with reference to the accompanying drawings, in which FIG. 1 is a diagrammatic illustration of the basic circuit and other parts of the device of the invention;

FIG. 2 is a diagrammatic view of a micro-hardness tester equipped with the device of the invention, and FIG. 3 is a partial sectional view of a part of the hardness tester in which the observation tube is replaced by a structural element serving to produce the hardness impression.

Referring to the drawings, FIG. 1 shows a measuring or work table 1 which is movable in a vertical direction as indicated by the arrow 3 by an electric motor 2 serving as a servomotor. With 4 is designated a compensation circuit in the form of a bridge comprising the resistances 5 and 6 and a remote control potentiometer 7. This potentiometer 7 is provided with a device 8 for the digital indication of the potentiometer position. Such a device is known as digital button and is commercially available. In conformance with the properties of the inductive scanner designated with 9 the digital button is provided with three digits.

The inductive scanner 9 consists of a primary winding 10, two oppositely wound secondary coils 11 and 12 and a displaceable core 13. This core 13 is slidably displaced in a longitudinal vertical direction when the table 1 is displaced. The secondary coils 11 and 12 are connected in the zero branch of the bridge 4 when the switch 14 is in the position shown in FIG. 1. In this position of the switch 14 the voltage supplied by the scanner 9 is conducted to an amplifier 15 the output of which is connected to the electric motor 2. The motor 2 now keeps displacing the table 1 until the initial voltage of the scanner 9 compensates for the voltage difference in the zero branch of the bridge controlled by the remote control potentiometer. As soon as this is the case, the electric motor 2 stops running.

The sensitivity of the scanner 9 is adjusted by means of the variable resistance 19. The condenser 20 in conjunction with the variable resistance 21 serves for adjusting the bridge circuit 4 to the phase relationship given by the scanner 9.

The remote control potentiometer 7 permits a preselection of a predetermined zero position of the table 1. By adjusting the potentiometer 7 it is possible to shift the table 1 about predetermined selectable distances which may be directly chosen by means of the digital button 8.

If the table 1 is not to be moved by preselected distances in terms of a distance control but in terms of a speed control, then it is necessary to shift the switch 14 to its downward position and to close the switch 16. Thereby the electric motor 2 is connected by way of the amplifier 15 to a device 17 which includes a potentiometer 18 and which serves to produce a voltage variable with respect to polarity and magnitude. The table 1 is then moved in terms of speed control, whereby the speed and the direction of displacement are controlled by the potentiometer 18. If after such a table displacement which is not controllable in respect of distance, the switch 14 is returned to the position shown in FIG. 1, the table 1 returns with a high degree of accuracy to the zero position previously set by means of the potentiometer 7.

In FIG. 2 a microscope support 22 is provided with a measuring table 23 which may be moved up and down by means of the electric motor 2' which corresponds to the motor 2 shown in FIG. 1. On the measuring table 23 is placed the workpiece 24 which may be observed through the microscope tube 25. A rotation of the digital button 8 in the illustrated position of the switch 14 effects first of all an optimal focussing. Thereafter the microscope tube 25 or a part of it is replaced by a unit 26 which carries a diamond 27 on the lower end of a movable piston-like structural element 28 (FIG. 3). A spring 30 rests with one end against a fixed partition 29 and with its other end against the upper end of the element 28 and urges the same downwardly.

After the device 26 has been inserted in the microscope, the switch 14 is shifted to the position shown in FIG. 3. The switch 16 is switched to the left so that the device 17 by way of the amplifier 15 feeds a voltage to the electric motor 2. The latter moves the table 23 up and the workpiece 24 placed on that table is pressed against the diamond 27. Thereby the movable element 28 is moved upward against the action of the spring 30. When a certain impression pressure is reached, two adjustable contact pins 31 and 32 come into engagement with each other. At that moment of contact a relay 33 pulls the switch 16 toward the right so that the electric motor 2 is disconnected from the device 17 and the table 23 ceases to move. After a certain retention time has passed, the switch 14 moves upward again so that the amplifier 15 again is connected into the zero branch of the compensation circuit 4. This causes the table 23 to move downward until the zero position set by the digital button 8 is reached. Thereupon the device 26 is again replaced by the microscope tube 25. Without any further steps the microscope is now optimally focussed which means that the hardness impression upon the workpiece 24 can be observed without any further readjustments.

It is apparent that the hardness tester illustrated in the FIGS. 2 and 3 may be completely automated by known means. It is merely necessary to provide an automatic control for the replacement of the microscope tube 25 by the device 26 and for the movements of the switch 14.

The property of the aforedescribed device to be able to store a certain condition at the position of adjustment may, for instance, also be utilized for searching a large environmental field from a zero position preselected within the adjustment range of the distance control of a work or measuring table, whereby that zero point may intermittently be returned to as often as desired.

While the measuring range of the inductive scanner 9 determines the adjustment range of the distance control, it does not determine the adjustment range of the speed control. The scanner 9 may be so constructed that the scanning pin or core 13 may be moved far beyond its measuring range. There may also be provided parallel to the inductive scanner 9 an auxiliary device, for instance in the form of a potentiometer, which takes over when the scanner 9 fails to produce a voltage because it was moved too far out of its measuring range. This not illustrated auxiliary means would then initiate the sign-correct approach to the zero position. Since, however, the range of response of inductive scanners is a multiple of their measuring range (10 to 50 times as much), such an auxiliary means may in general not be required.

What I claim is:

1. A device for the remote control adjustment of a measuring or work table, comprising a servo motor arranged for displacing said table from a predetermined zero position, an inductive scanner for sensing the amount of the table displacement away from said zero position, a compensating circuit including a remote control potentiometer which serves for the preselection and storage of a reference voltage which determines said zero position, means for connecting said inductive scanner with said compensating circuit, said compensating circuit generating a difference voltage when the voltage generated by said inductive scanner differs from said reference voltage, means for generating a variable voltage, and a switch for selectively connecting said servo motor to said variable voltage generating means in order to displace said table and to said compensating means in order to move said table back into its zero position.

2. A device for the remote control adjustment of a measuring or work table, comprising a compensating circuit including a remote potentiometer and means forming a bridge circuit having a zero branch, the voltage in said zero branch being variable by means of said remote control potentiometer, an inductive scanner connected with said zero branch for sensing the amount of the table displacement, said compensating circuit serving for the preselection and storage of a table zero position, means for generating a variable voltage to displace said table from said zero position, a servo motor, a switch for selectively connecting said servo motor effecting said table displacement to said means generating said variable voltage or to said compensating circuit, and a hardness tester provided with a penetrating element, said adjustable table carrying a workpiece being connected with said hardness tester against whose penetrating element said workpiece is pressed when said table is moved out of its zero position, said penetrating element being replaceable by a microscope for observing the impression on said workpiece in the zero position of said table.

3. A device for the remote control adjustment of a measuring or work table, comprising a compensating circuit including a remote potentiometer and means forming a bridge circuit having a zero branch, the voltage in said zero branch being variable by means of said remote control potentiometer, an inductive scanner connected with said zero branch for sensing the amount of table displacement, said compensating circuit serving for the preselection and storage of a table zero position, means for generating a variable voltage to displace said table from said zero position, a servo motor, and a switch for selectively connecting said servo motor effecting said table displacement to said means generating said variable voltage or to said compensating circuit.

4. A device according to claim 3, in which said remote control potentiometer is provided with means for the digital indication of the potentiometer adjustment.

5. A device according to claim 3, in which said inductive scanner has the form of a differential transformer provided with a displaceable core.

References Cited

UNITED STATES PATENTS

| 3,036,253 | 5/1962 | Bramley. | |
| 3,122,688 | 2/1964 | Houpt. | |
| 3,120,753 | 2/1964 | Green et al. | 73—81 |
| 3,123,997 | 3/1964 | Cosner | 73—81 |
| 3,295,363 | 1/1967 | Delporte | 73—81 |

OTHER REFERENCES

"Fundamentals of Servomechanisms," S. W. Herwald—Product Engineering—June 1964.

JAMES J. GILL, Primary Examiner